(12) United States Patent
Lipscomb et al.

(10) Patent No.: US 8,261,696 B1
(45) Date of Patent: Sep. 11, 2012

(54) ANIMAL WATER TOY AND FOUNTAIN

(75) Inventors: John M. Lipscomb, Cedarburg, WI (US); Stanley L. Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 237 days.

(21) Appl. No.: 12/607,796

(22) Filed: Oct. 28, 2009

Related U.S. Application Data

(60) Provisional application No. 61/109,057, filed on Oct. 28, 2008.

(51) Int. Cl.
*A01K 7/00* (2006.01)
(52) U.S. Cl. ............... 119/74; 119/707; 119/702
(58) Field of Classification Search .......... 119/707, 119/702, 74
See application file for complete search history.

(56) References Cited

U.S. PATENT DOCUMENTS

| | | | | |
|---|---|---|---|---|
| 1,893,507 | A * | 1/1933 | Ranney | 446/156 |
| 1,920,960 | A * | 8/1933 | Cogsdill | 15/103.5 |
| 2,503,832 | A * | 4/1950 | McCune | 446/166 |
| 2,540,687 | A * | 2/1951 | Netterstrom | 15/21.2 |
| 3,548,786 | A * | 12/1970 | Willinger | 119/254 |
| 3,901,191 | A * | 8/1975 | Smith | 119/51.03 |
| 4,386,582 | A * | 6/1983 | Adsit | 119/51.03 |
| 4,976,220 | A * | 12/1990 | Gershman | 119/475 |
| 5,329,876 | A * | 7/1994 | Tracy | 119/51.03 |
| 5,501,178 | A | 3/1996 | Kemp | |
| 5,579,725 | A | 12/1996 | Boshears | |
| 5,799,609 | A | 9/1998 | Burns | |
| 5,870,971 | A | 2/1999 | Krietzman et al. | |
| 6,055,934 | A | 5/2000 | Burns | |
| 6,460,483 | B1 | 10/2002 | Northrop | |
| 6,526,916 | B1 | 3/2003 | Perlsweig | |
| 6,622,657 | B2 | 9/2003 | Northrop | |
| 6,928,954 | B2 | 8/2005 | Krishnamurthy | |
| 7,089,881 | B2 | 8/2006 | Plante | |
| 2006/0059613 | A1* | 3/2006 | Feltman | 4/496 |

* cited by examiner

*Primary Examiner* — Kimberly Berona
(74) *Attorney, Agent, or Firm* — Boyle Fredrickson, S.C.

(57) ABSTRACT

An animal water toy that includes one or more playthings carried by flowing water that entices an animal, such as a cat, into interaction therewith. Playthings can be received in a container having water drinkable by the animal that is propelled by a pump into flowing and carrying the playthings. A portion can be upraised above the water providing an animal perch and/or flow director imparting flow deviations causing unpredictable plaything movement helping enhance animal interaction. A conveyance device can be provided conveying playthings relative to the flow. A pet watering device, e.g., fountain, can include an animal toy constructed in accordance with the present invention and a conveyance device lifting playthings from one level of the watering device to another. In one embodiment, playthings are animal attractant objects that can be buoyant and configured to attract an animal, such as by its color, graphics, indicia, and/or shape.

19 Claims, 4 Drawing Sheets

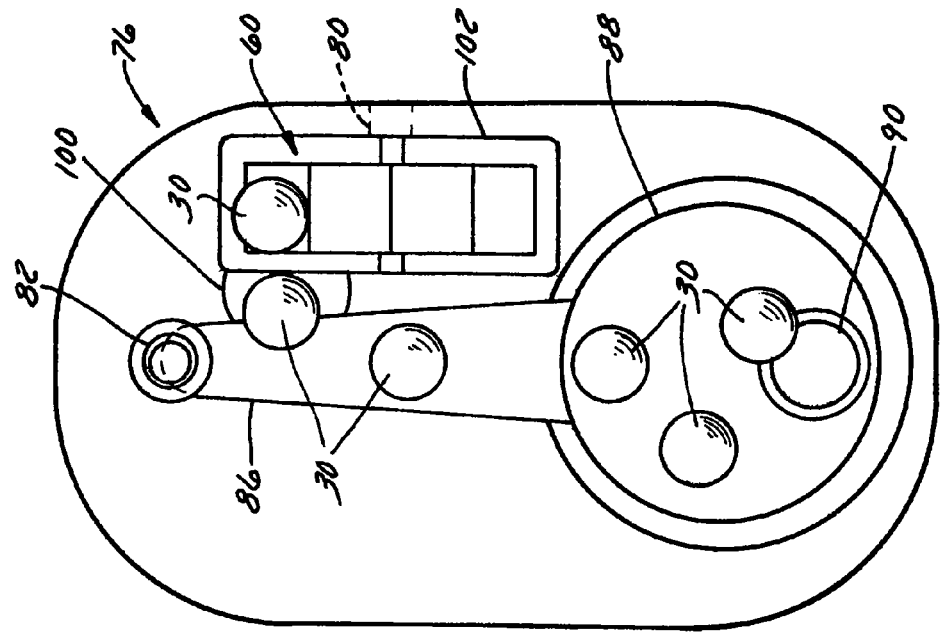
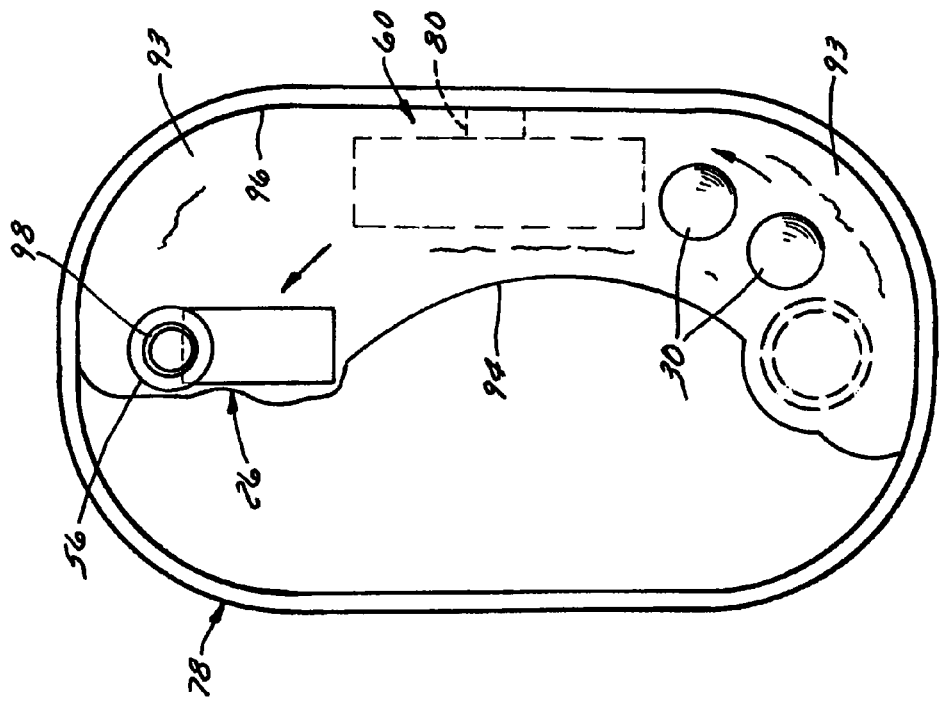

ANIMAL WATER TOY AND FOUNTAIN

CROSS-REFERENCE

This application claims the benefit under 35 U.S.C. §119 (e) of U.S. Provisional Application Ser. No. 61/109,057, filed Oct. 28, 2008, the entirety of which is expressly incorporated by reference herein.

FIELD

The present invention relates to a water toy for an animal, such as a cat, and more particularly to a water toy capable of being used with recirculating water including in or with a pet watering device, such as a pet fountain.

BACKGROUND

Cats are naturally curious and possess a natural desire to play or hunt, yet many times appear to both be interested in and yet apprehensive of water. While many toys for cats have been developed, few are water toys and even fewer are water toys that can be implemented in or with a watering device, such as a cat fountain.

What is needed is a water toy well suited for use with cats that can be implemented with a pet watering device, such as a fountain.

SUMMARY

The present invention is directed to an animal water toy having a plurality of animal playthings carried by water flowing in a manner that helps entice and enhance animal interaction therewith. The animal water toy includes a source of water that flows carrying one or more animal playthings with the water. The water can be disposed in a container and caused to flow via a prime mover, such as a pump, that propels water. A perch can be provided in the water upon which part of the animal can be supported when interacting with one or more playthings carried by flowing water. A flow director arrangement having one or more flow directors can also be employed to help cause water carrying a plaything to flow in a more unpredictable manner that causes the plaything to move unpredictably helping to enhance animal interaction. The animal water toy can also include a conveyance device constructed and arranged to convey one or more playthings from one location to another.

An animal toy constructed in accordance with the present invention can also be part of an animal watering device, such as a fountain. An example of one such fountain adaptable for use with an animal to constructed in accordance with the present invention is disclosed in commonly owned, co-pending U.S. application Ser. No. 12/474,460, the entirety of which is expressly incorporated herein. Such an animal watering device can be configured to recirculate water that flows carrying a plurality of playthings with the flowing water in a manner that also causes the plurality of playthings to recirculate. In one preferred embodiment, playthings recirculate along one circuit and water recirculates along another circuit with a portion of both circuits converging and a water conveyance device conveying playthings from one level of the animal watering device to another level.

An animal plaything can be an animal attractant object configured in a manner that helps attract an animal, such as a cat, by its color, graphics, indicia, and/or shape. Such an animal plaything can be buoyant so as to be able to at least partially float in the water helping to facilitate movement of the plaything in the water resulting from water flow. Such a plaything can be constructed so as to inhibit bacterial growth and/or prevent bacterial accumulation on or in the plaything.

In one embodiment constructed according with the present invention, water flows along the recirculating path with flow caused by a pump discharging water in one direction. A plurality of playthings are carried by the flowing water causing the playthings also to recirculate with the water. An upraised portion, such as a platform, can be disposed in the water and extending above the surface of the water to provide a perch for the animal, a flow director arrangement causes water flow and plaything movement deviations, or a combination perch and flow director arrangement. A conveyance device, such as a water wheel, can be provided that removes one or more playthings from flowing water in one location and returns the one or more playthings to flowing water in another location. While another liquid can be used, water is employed as it can be consumed by the animal before, during or after interaction with one or more playthings in the water.

In another embodiment constructed in accordance with the present invention, the conveyance device is used to lift one or more playthings from water flowing in a lower level of a pet watering device to a higher level of the pet watering device. One pet watering device is a pet fountain having a base with a water accumulating sump disposed therein at a lower level defined by a flow path that directs water flowing in the sump to the conveyance device. Playthings in the water flowing to the conveyance device are lifted out of the water in some and raised to a cover disposed on the base that is at a higher level. Water continues to flow beyond the conveyance device to a pump that directs the water to the cover wherein it flows along a spillway carrying away playthings from the conveyance device to a basin having a drain port sized large enough to allow a plaything to pass therethrough into the sump along with water draining from the basin.

Other advantages, benefits and features of the present invention will become apparent to those skilled in the art upon reading the detailed description and viewing the related drawings.

DRAWING DESCRIPTION

One or more preferred exemplary embodiments of the invention are illustrated in the accompanying drawings in which like reference numerals represent like parts throughout and in which:

FIG. 5 is a top plan view of a cover of the animal watering device and animal water toy of FIG. 4; and FIG. 6 is a top plan view of a base of the animal watering device and animal water toy of FIG. 4.

Figure 1:
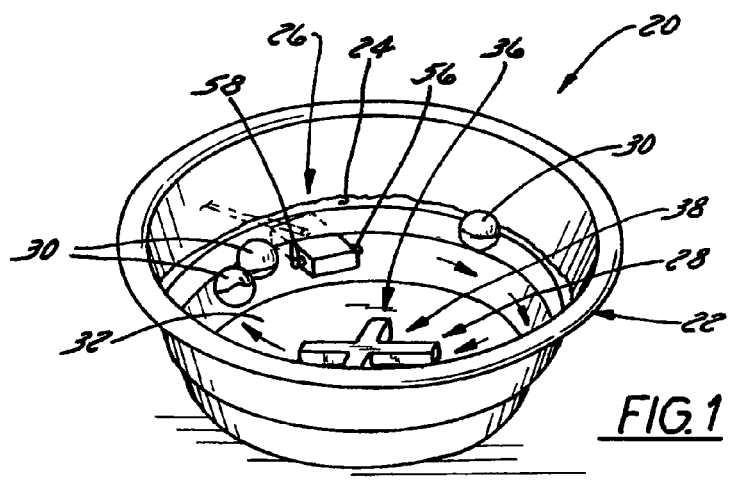
FIG. 1 is a perspective view of a first embodiment of an animal water toy constructed in accordance with the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIG. 1 illustrates a preferred embodiment of an animal water toy 20 that includes a container 22 which contains water 24 propelled by a pump 26 that can be of submersible construction, for causing a plurality of objects 30 configured to be an attractant or plaything to an animal, such as a cat, to be carried by the moving water 24. The water 24 is held in a the container 22 and propelled by pump 26 to create a flow of moving water, such as the stream of moving water 24 indicated by the directional arrows show in FIG. 1, carrying each animal attractant object 30 in the direction of flow. As the animal attractant objects 30 are carried by the water, they entice the cat to interact with one or more of them, such as by batting an object 30, trying to catch an object 30, etc.

Figure 3:
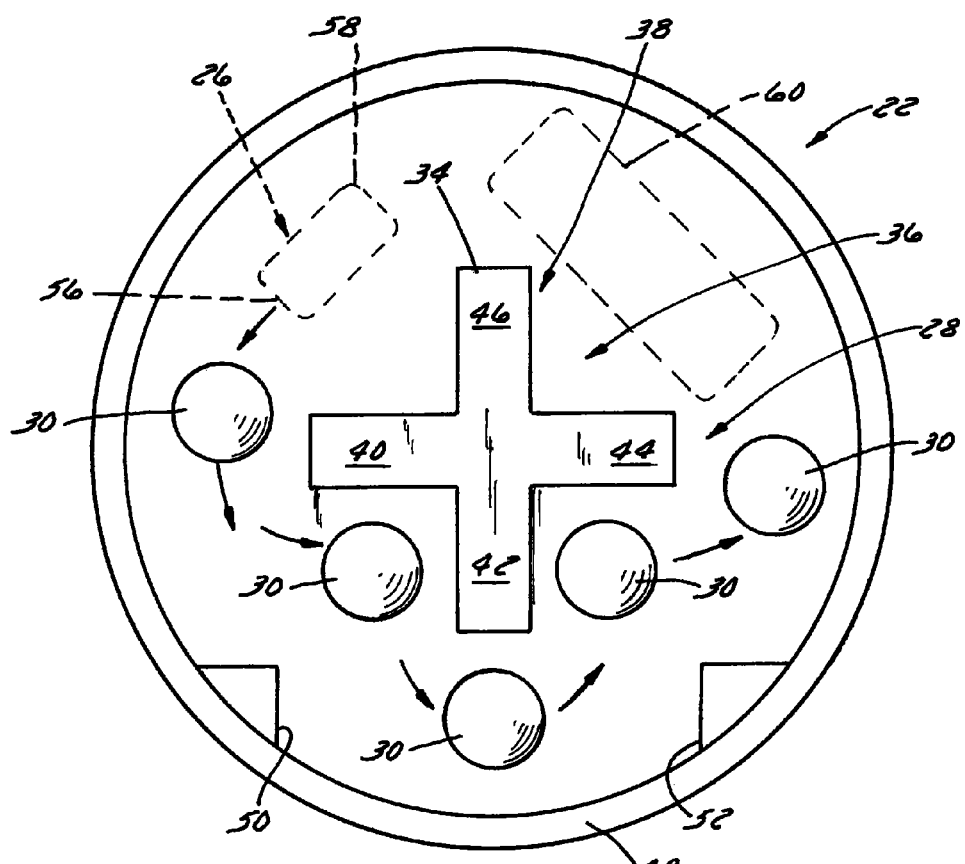
FIG. 3 is a top plan view of the water toy of FIGS. 2 and 3.

The animal water toy 20 can include an upraised platform 28 that extends upwardly from a bottom wall 32 of the container 22 so as to have a portion disposed out of the water, such as depicted in FIGS. 1 and 3. Such an upraised platform 28 is disposed within container 22 and can be integrally formed with the container 22, such as by being molded therewith.

The upraised platform 28 can be configured with a top surface 34 (FIG. 3) that is generally planar or otherwise suitably configured for a cat to be at least be partially supported thereon, enabling the cat to do so during interaction with one or more of the animal attractant objects 30. In a preferred embodiment, the upraised platform 28 is a perch 36 upon which a cat can at least partially be supported by at least one of its paws thereon while using at least one other of its paws to interact with one or more of the animal attractant objects 30.

The upraised platform 28 can also be configured to disrupt or direct at least part of the flow of moving water 24 in a manner that causes the flow to deviate in a manner that causes unpredictable movement of one or more of the animal attractant objects 30 carried by the water helping entice or enhance animal interaction. In a preferred embodiment, the upraised platform 28 includes an integrally formed flow director arrangement 38 that is configured to cause the flow of water to deviate, such as by causing swirls or eddies, which cause one or more animal attractant objects 30 to move unpredictably. With reference to FIG. 3, the flow director arrangement 38 has a plurality of flow directors 40, 42, 44, 46, each of which projects generally toward and/or into the flow so as to interact with moving water 24, such as to cause the moving water 24 to form swirls or eddies.

In one preferred embodiment, the upraised platform 28 is configured to not only provide an integrally formed perch 36 but also an integrally formed flow director arrangement 38 disposed at or adjacent a center of the interior of basin. The upraised platform 28 includes four outwardly extending flow directors 40, 42, 44, 46 that each extend radially outwardly from the central region of the container 22 toward an outer sidewall 48 of the container 22.

If desired, the animal water toy 20 can also include one or more generally opposed flow directors 50, 52, such as the pair of flow directors 50 and 52 shown in FIG. 3 that extend radially inwardly from the container sidewall 48. Each one of these outer flow directors 52 and 54 can be positioned between a pair of inner flow directors 40, 42, 44, 46. For example, as is shown in FIG. 3, outer flow director 50 is disposed between flow directors 40 and 42 helping to direct the flow of water in a manner that directs an animal attractant object toward platform 28 in between flow directors 40 and 42. Likewise, outer flow director 52 is disposed between flow directors 42 and 44 helping to direct flow and cause animal interaction and placing animal attractant object movement.

Each animal attractant object 30 is shown in the drawing figures as being a round ball, but can have any shape or configuration that is suitable for use in water and which facilitates attraction or interaction with an animal, such as a cat. For example, each object 30 can be brightly colored and have different colors with the colors chosen to maximize attraction of a cat. Similarly, each object 30 can have graphics or other visible indicia thereon that help attract a cat. Finally, each object 30 can also be shaped in a manner that helps attract a cat.

In a preferred embodiment, each animal attractant object 30 is a round ball that is buoyant so as to be able to float in the water 24 helping it to be carried by the water 24 as it flows around within the container. Each animal attractant object 30 can be of a construction or configuration that helps minimize accumulation and/or growth of bacteria thereon. For example, each animal attractant object 30 can have an outer surface that is of a sharkskin like configuration that inhibits bacteria from clinging and growing thereon. If desired, each animal attractant object 30 can have an antibacterial composition that includes triclosan, silver or another suitable antibacterial constituent.

The pump 26 can be electrically powered, such as via a cord 27 (FIG. 2) connected to ordinary household current. Although not shown in the FIGS. 1-3, the pump 26 can be disposed in a pocket or shroud attached to or otherwise formed in the bottom wall 32 and/or sidewall 48 of the container 22 that has an outlet disposed in line with an outlet 56 of the pump 26. It can also have an inlet or another suitable configuration for allowing water 24 to enter an inlet 58 of the pump 26. Where such a pocket or shroud is used, preferably it is smoothly and aerodynamically configured to enable each one of the animal attractant objects 30 to pass over so as to recirculate within the container 22.

Figure 2:
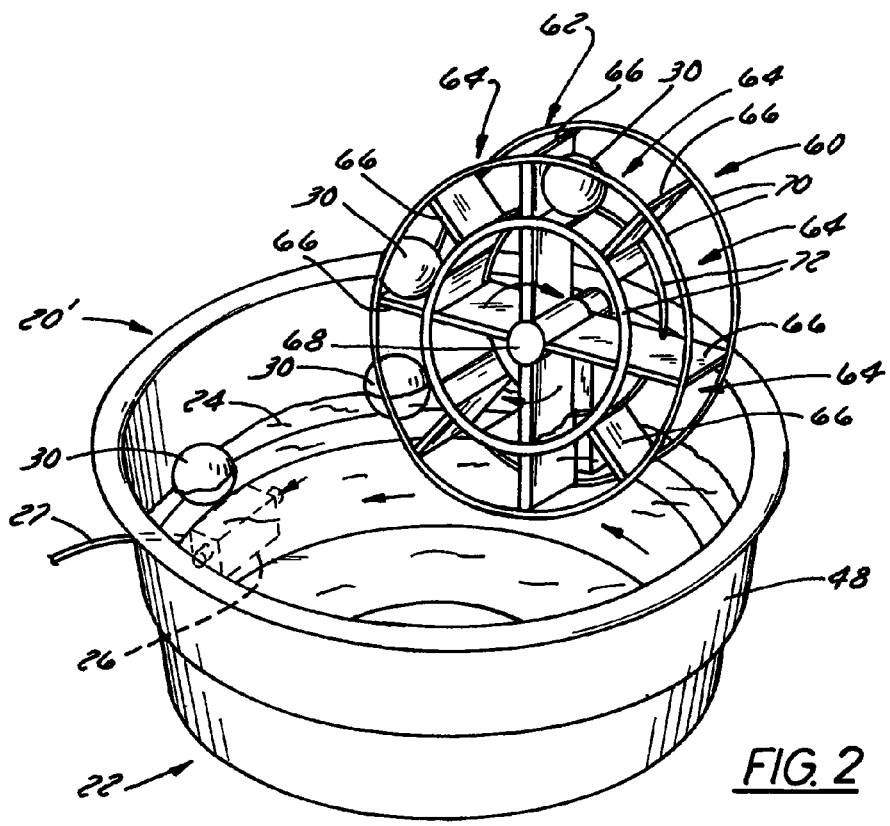
FIG. 2 is a perspective view of a second preferred embodiment of an animal water toy constructed in accordance with the present invention.

FIG. 2 illustrates another preferred embodiment of a water toy 20' constructed in accordance with the present invention. The water toy 20' is similar to that shown in FIG. 1 but has a generally circular upraised platform 28', which also can serve as a perch, and an animal attractant conveyance device 60 that can be driven by a separate prime mover, such as an electric motor or the like, but can also be driven by the flow of water 24, such as is depicted in FIG. 2. In the preferred embodiment shown in FIG. 2, the animal attractant conveyance device 60 is constructed and arranged to receive at least one animal attractant object 30 and convey it from one location of the animal toy 20' to another location of the animal toy 20' such as by lifting the animal attractant object 30 out of the water 24 at one location and returning it back to the water 24 in another location.

An example of a preferred animal attractant conveyance device 60 is shown in FIG. 2 and is a water wheel 62 having animal attractant object receivers 64 disposed about its periphery that are each constructed and arranged to receive and retain at least one of the animal attractant objects 30. Each one of the receiver 64 includes a pair of adjacent object supports 66, each of which can be a paddle, platform or the like, that defines a pocket therebetween in which an object 30 can be received. A plurality of pairs, i.e., at least three, of the supports 66 extend radially inwardly where they attach to a hub or axle 68 that rotatively supports the wheel 62. Each one of the supports 66 is carried by framework that includes a pair of outer rings 70 and a pair of inner rings 72 disposed between the hub/axle 68 and the outer ring 70.

In one preferred embodiment, an electric motor is attached to the container, such as to its outer sidewall, at or adjacent the hub/axle 68, and is configured to rotate the water wheel in a counterclockwise direction opposite the direction of water flow so that each animal attractant object receiver 64 can receive an animal attractant object 30 directed therein by the flow of water 24 and lifted by the receiver from the water 24. As the water wheel further rotates, each object 30 received in each receiver 64 can be supported on inner rings 72 as well as one of the object supports 66 after being lifted from the water. Continued rotation of the water wheel results in each one of the receivers 64 conveying its object 30 back into the water 24 on the other side of the water wheel where the object 30 can continue recirculating with the water 24 within the container 22.

While each object 30 is being conveyed by the water wheel, it can be seen by a cat with its out-of-the-water movement above the container 22 helping to attract a cat and/or further entice the cat into interacting with the object 30. In a preferred embodiment, the spacing between the supports 66 and rings 70, 72 is selected to make it difficult for a cat to remove an object 30 being conveyed by the water wheel. This makes it more challenging for the cat while helping to prevent loss of the objects 30 from the water toy.

Figure 4:
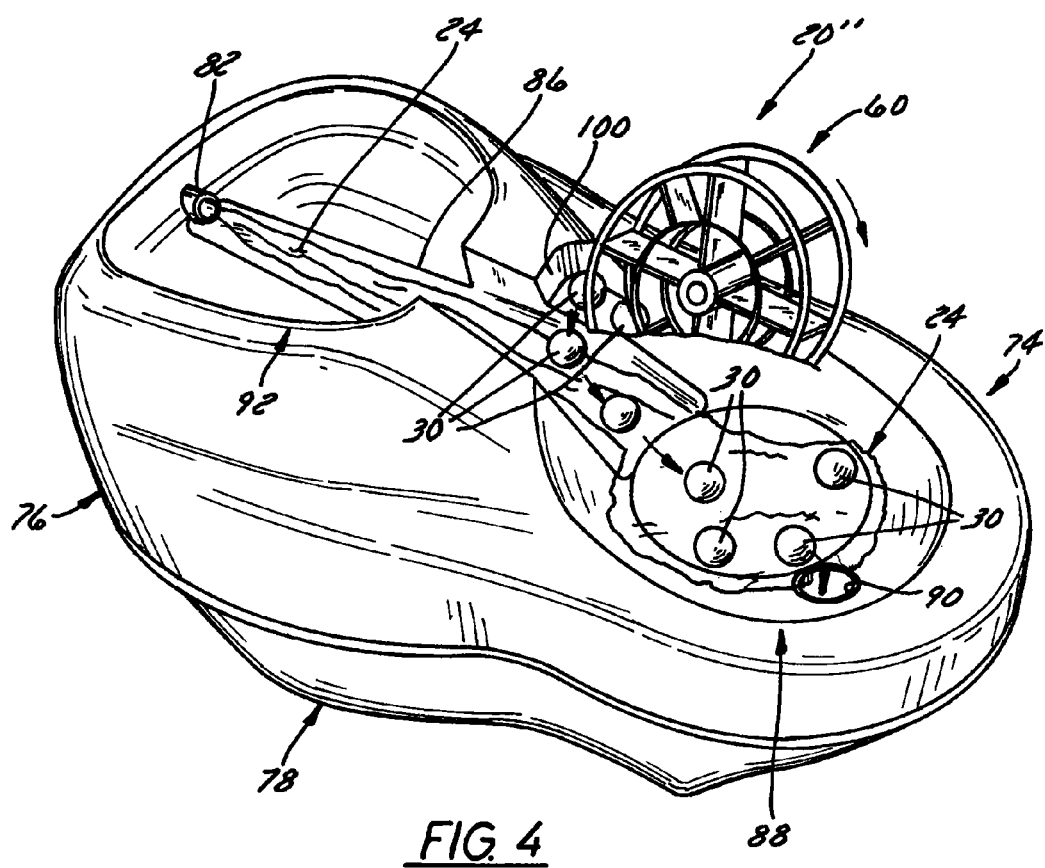
FIG. 4 is a perspective view of a third preferred embodiment of an animal water toy constructed in accordance with the present invention integrated with an animal watering device.

FIGS. 4-6 illustrate another embodiment of an animal water toy 20" that is configured to be part of a pet watering device 74, such as the pet fountain shown in FIGS. 4-6. The pet fountain 74 includes a cover 76 received on a base 78 with the cover 76 configured to receive water 24 and allow water 24 to flow in a manner that an animal can drink with animal attractant objects 30 carried by the water 24 enticing interaction therewith by the animal. An animal attractant conveyance device 60 driven by an electric motor 80 (depicted in phantom in FIGS. 5 and 6) lifts animal attractant objects 30 from within the base 78 onto the cover 76 where flowing water carries them back into the base 78 as described below.

With reference to FIG. 5, the cover 76 includes an inlet 82 from which water 24 pumped from the base 78 is discharged. The water 24 flows out of the inlet 82 and along a spillway 86 to a basin 88 formed in the cover 76 with the basin 88 having a drain port 90 large enough so at least one animal attractant object 30 can pass through the port 90 with water draining from the basin 88. Spillway 86 can be a recess, such as the elongate channel shown in FIGS. 4 and 5, which is formed in the cover 76 or can be a smooth portion of the cover 76 along which water flows, with each object 30 being carried with the flow and staying therein such as due to surface tension between the water and each object. In a preferred embodiment, the basin 88 and drain port 90 are constructed and arranged so that a pool of water 24 remains in the basin 88, at least during fountain operation, enabling an animal, such as a cat, to drink from water in the basin. If desired, the cover 76 can include another basin 92 (FIG. 4) adjacent the inlet 82 which can be configured so water can also pool therein. If desired, the cover 76 can be formed without any such upper basin 92 such as is depicted by FIG. 5.

The base 78 is shown in more detail in FIG. 6. The base 78 includes a sump 93 defined at least in part by a baffle or inner wall 94 that directs water 24 that has flowed through the drain port 90 (depicted in phantom in FIG. 4) in the cover 76 toward the water conveyance device, shown in phantom in FIG. 4. Inner wall 94 cooperates with outer wall 96 in directing the flow of water in the sump 93. As the water flows toward the conveyance device 60, each animal attractant object 30 that has passed through the drain port 90 (shown in phantom in FIG. 6) is carried by water in the sump 93 toward the conveyance device. Water passes by the conveyance device 60 to a pump 26 in the base with the pump 26 having an outlet 56 in communication with a tube 98 leading to inlet 82.

Each animal attractant object 30 received by the conveyance device 60 is conveyed from the base 78 to the cover 76 where it exits the conveyance device 60 onto a guide 100 formed in the cover 76 that directs the object 30 toward the spillway 86. As the object 30 travels from the guide 100 onto the spillway 86, flowing water 24 carries the object 30 toward the basin 88. If desired, the basin 88 can include a perch (not shown) and/or a flow director arrangement (not shown). As each object 30 is carried by the water 24 flowing along the spillway 86 into the basin 88, it can move with the water such that swirls or eddies cause the object 30 to move unpredictably helping to entice and enhance animal interaction. At some point, the object 30 is carried by the water 24 toward the drain port 90 where it is carried by flowing water through the drain port 90 into the sump 93 in the base 78. In this manner, not only does the water 24 recirculate but each object 30 also recirculates.

In the embodiment shown in FIGS. 4-6, the conveyance 60 device is a water wheel, such as the same as or like the water wheel 62 shown in FIG. 2, which extends through an aperture 102 in the cover 76. Where such water wheel is used, it preferably rotates opposite the direction of flow of the water 24 in the sump 93. However, another conveyance device can be used that is configured to lift one or more objects 30 from a sump in the base 78 onto the cover 76 enabling recirculation of the objects 30.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. An animal water toy and pet fountain comprising:
    (a) a base comprising a water-holding sump in which a pump is disposed;
    (b) a cover carried by the base that receives a flow of water discharged from the pump that flows into a water-holding basin having a drain formed therein and into the sump;
    (c) at least one buoyant toy configured to attract an animal that is carried by flowing water; and
    (d) a rotary water wheel transferring the at least one buoyant toy between the sump and the cover.

2. The animal water toy and pet fountain of claim 1 wherein the water wheel displaces the at least one buoyant toy from the water.

3. The animal water toy and pet fountain of claim 1 wherein water in the sump is disposed at one level and water flowing to the drain is disposed at another level that is higher than the one level, and wherein the water wheel transfers the at least one buoyant toy from the one water level to the another water level.

4. The animal water toy and pet fountain of claim 1 further comprising a prime mover driving the water wheel.

5. The animal water toy and pet fountain of claim 4 wherein the prime mover drives the water wheel opposite the direction of water flow.

6. The animal water toy and pet fountain of claim 4 wherein the prime mover comprises an electric motor operatively coupled to the water wheel.

7. The animal water toy and pet fountain of claim 1 wherein the drain comprises an opening formed in the basin that is large enough to allow the at least one buoyant toy to pass therethrough into the sump.

8. The animal water toy and pet fountain of claim 1 wherein the pet fountain comprises a recirculating water fountain with the pump recirculating water from the sump to the cover and wherein the at least one buoyant toy recirculates with the recirculating water.

9. The animal water toy and pet fountain of claim 1 wherein the at least one buoyant toy is carried by water flowing into the basin and through the drain downwardly into the sump where the at least one buoyant toy is carried by water flowing in the sump toward the water wheel which transfers the at least one buoyant toy from the sump upwardly to the cover during rotation of the water wheel.

10. The animal water toy and pet fountain of claim 9 wherein the at least one buoyant toy is delivered onto the cover by the water wheel where water flowing toward the basin carries the at least one buoyant toy to the drain.

11. The animal water toy and pet fountain of claim 1 wherein the cover is received on the base and overlies the pump.

12. The animal water toy and pet fountain of claim 11 wherein the inlet comprises a tube extending from the pump to the cover.

13. The animal water toy and pet fountain of claim 1 wherein the cover comprises a spillway communicating water discharged from the inlet to the basin.

14. The animal water toy and pet fountain of claim 1 wherein there are a plurality of buoyant toys.

15. The animal water toy and pet fountain of claim 14 wherein each one of the buoyant toys comprises a ball.

16. An animal water toy and pet fountain comprising:
   (a) a base comprising a water-holding sump in which a pump is disposed;
   (b) a cover received on the base directing a flow of water from the sump discharged by the pump onto the cover where the water flows into a water-holding basin formed in the cover that comprises a drain through which water flows into the sump;
   (c) a plurality of buoyant toys configured to attract an animal that are carried by water flowing along the cover through the drain and into the sump; and
   (d) a water wheel transferring the plurality of buoyant toys from the sump to the cover during rotation of the water wheel.

17. The animal water toy and pet fountain of claim 16 wherein each one of the plurality of buoyant toys is carried by water in the sump toward the water wheel which transfers each one of the buoyant toys to the cover where water flowing on the cover carries each one of the buoyant toys to the drain.

18. An animal water toy and pet fountain comprising:
   (a) a base comprising a water-holding sump in which a pump is disposed;
   (b) a cover received on the base directing a flow of water from the sump discharged by the pump onto the cover flows along a spillway into a water-holding basin and through a drain disposed in the basin into the sump;
   (c) a plurality of buoyant toys configured to attract an animal that are carried by water flowing along the spillway into the basin, through the drain, and into the sump; and
   (d) a water wheel carried by the base that transfers the plurality of buoyant toys from the sump to the cover during rotation of the water wheel where water flowing along the spillway carries the plurality of buoyant toys toward the basin.

19. The animal water toy and pet fountain of claim 18 wherein the cover overlies the pump and comprises an inlet in communication with the pump such that water is pumped from the sump by the pump through the inlet onto the cover, wherein the spillway is formed in the cover and extends alongside the water wheel, wherein the basin is formed in the cover, wherein the drain comprises a circular port formed in the bottom of the basin that extends through the basin, and wherein water falls from the drain into the sump carrying the plurality of buoyant water toys toward the water wheel.

* * * * *